(12) United States Patent
Song et al.

(10) Patent No.: US 10,899,669 B2
(45) Date of Patent: Jan. 26, 2021

(54) BORON ALUMINUM SILICATE MINERAL MATERIAL, LOW TEMPERATURE CO-FIRED CERAMIC COMPOSITE MATERIAL, LOW TEMPERATURE CO-FIRED CERAMIC, COMPOSITE SUBSTRATE AND PREPARATION METHODS THEREOF

(71) Applicant: GUANGDONG FENGHUA ADVANCED TECHNOLOGY HOLDING CO., LTD., Guangdong (CN)

(72) Inventors: Zhe Song, Guangdong (CN); Yun Liu, Guangdong (CN); Kun Huang, Guangdong (CN); Luwei Fu, Guangdong (CN); Zhenxiao Fu, Guangdong (CN); Joanna Chu, Guangdong (CN); Lasse Noren, Guangdong (CN); Tao Chen, Guangdong (CN); Shiwo Ta, Guangdong (CN)

(73) Assignee: GUANGDONG FENGHUA ADVANCED TECHNOLOGY HOLDING CO., LTD., Zhaoqing (CN)

( * ) Notice: Subject to any disclaimer, the term of this patent is extended or adjusted under 35 U.S.C. 154(b) by 0 days.

(21) Appl. No.: 16/618,112

(22) PCT Filed: Mar. 13, 2018

(86) PCT No.: PCT/CN2018/078781
§ 371 (c)(1),
(2) Date: Nov. 28, 2019

(87) PCT Pub. No.: WO2019/019657
PCT Pub. Date: Jan. 31, 2019

(65) Prior Publication Data
US 2020/0123059 A1   Apr. 23, 2020

(30) Foreign Application Priority Data

Jul. 26, 2017   (CN) .......................... 2017 1 0620547

(51) Int. Cl.
*C04B 35/16* (2006.01)
*C01B 33/24* (2006.01)
(Continued)

(52) U.S. Cl.
CPC .............. *C04B 35/16* (2013.01); *C01B 33/24* (2013.01); *C01B 33/26* (2013.01); *C04B 35/117* (2013.01);
(Continued)

(58) Field of Classification Search
CPC ........... C03C 1/00; C01B 33/24; C01B 33/26; C04B 35/117; C04B 35/18;
(Continued)

(56) References Cited

U.S. PATENT DOCUMENTS

| | | | | |
|---|---|---|---|---|
| 7,601,446 B2 * | 10/2009 | Ikenishi | .................. | C03C 3/085 428/846.9 |
| 7,968,380 B2 * | 6/2011 | Hashimoto | ............... | C03C 8/02 438/127 |

(Continued)

*Primary Examiner* — Noah S Wiese

(57) ABSTRACT

The present invention relates to a boroaluminosilicate mineral material, a low temperature co-fired ceramic composite material, a low temperature co-fired ceramic, a composite substrate and preparation methods thereof. A boroaluminosilicate mineral material for a low temperature co-fired ceramic, the boroaluminosilicate mineral material comprises the following components expressed in mass percentages of the following oxides: 0.41%-1.15% of $Na_2O$, 14.15%-23.67% of $K_2O$, 1.17%-4.10% of CaO, 0-2.56% of $Al_2O_3$, 13.19%-20.00% of $B_2O_3$, and 53.47%-67.17% of $SiO_2$. The aforementioned boroaluminosilicate mineral material is chemically stable; a low temperature co-fired ceramic prepared from it not only has excellent dielectric properties, but (Continued)

also has a low sintering temperature, a low thermal expansion coefficient, and high insulation resistance; it is also well-matched with the LTCC process and can be widely used in the field of LTCC package substrates.

15 Claims, 2 Drawing Sheets

(51) Int. Cl.
    *C01B 33/26*     (2006.01)
    *C04B 35/117*     (2006.01)
    *C04B 35/626*     (2006.01)
    *C04B 35/634*     (2006.01)
    *C04B 35/64*     (2006.01)

(52) U.S. Cl.
    CPC ...... *C04B 35/6261* (2013.01); *C04B 35/6264* (2013.01); *C04B 35/62655* (2013.01); *C04B 35/6342* (2013.01); *C04B 35/63416* (2013.01); *C04B 35/64* (2013.01); *C01P 2002/72* (2013.01); *C01P 2004/03* (2013.01); *C04B 2235/3217* (2013.01); *C04B 2235/3454* (2013.01); *C04B 2235/3481* (2013.01); *C04B 2235/606* (2013.01); *C04B 2235/6567* (2013.01)

(58) Field of Classification Search
    CPC . C04B 35/6261; C04B 35/6264; C04B 35/64; C04B 35/10; C04B 2235/3217; C04B 2235/3454; C04B 2235/3481
    USPC .......................................................... 501/27
    See application file for complete search history.

(56) References Cited

U.S. PATENT DOCUMENTS

| | | | |
|---|---|---|---|
| 2003/0047849 A1* | 3/2003 | Dai | H01L 23/15 264/681 |
| 2007/0197366 A1* | 8/2007 | Aoki | C03B 5/235 501/11 |
| 2008/0087044 A1* | 4/2008 | Carty | C03C 1/002 65/29.12 |

* cited by examiner

BORON ALUMINUM SILICATE MINERAL MATERIAL, LOW TEMPERATURE CO-FIRED CERAMIC COMPOSITE MATERIAL, LOW TEMPERATURE CO-FIRED CERAMIC, COMPOSITE SUBSTRATE AND PREPARATION METHODS THEREOF

FIELD OF THE INVENTION

The present invention relates to a boroaluminosilicate mineral material, a low temperature co-fired ceramic composite material, a low temperature co-fired ceramic, a composite substrate and preparation methods thereof.

BACKGROUND OF THE INVENTION

Low temperature co-fired ceramic (LTCC) technology is a new technique for multi-layer substrates that emerged in the mid-1980s. The technique employs a unique material system that can be co-fired with metal conductors to improve the performance of electronic devices. It also adopts a unique multi-layer co-firing process, which greatly reduces process complexity and thus improves component reliability. At present, LTCC technology has been widely used in various fields including wireless communications, semiconductors, optoelectronics, MEMS, among others.

The basis of LTCC technology is LTCC material properties and applications. When applied to electronic package substrates, to ensure the transmission quality of high-frequency communication signals, LTCC materials should have low dielectric constants and low dielectric loss. However, most LTCC materials on the market currently have poor dielectric properties and cannot satisfy the requirements for manufacturing electronic package substrates.

SUMMARY OF THE INVENTION

Following the discussions above, it is necessary to provide a boroaluminosilicate mineral material, a low temperature co-fired ceramic composite material, a low temperature co-fired ceramic, a composite substrate and preparation methods thereof to tackle the problem of poor dielectric properties of most LTCC materials on the market.

A boroaluminosilicate mineral material for a low temperature co-fired ceramic, characterized in that the boroaluminosilicate mineral material comprises the following components expressed in mass percentages of the following oxides:

| | |
|---|---|
| $Na_2O$ | 0.41%-1.15%; |
| $K_2O$ | 14.15%-23.67%; |
| CaO | 1.17%-4.10%; |
| $Al_2O_3$ | 0-2.56%; |
| $B_2O_3$ | 13.19%-20.00%; |
| $SiO_2$ | 53.47%-67.17%. |

The ratio of the components of the aforementioned boroaluminosilicate mineral material is adequate and is thus chemically stable. Mixing the aforementioned boroaluminosilicate mineral material with $Al_2O_3$ gives a low temperature co-fired ceramic composite material that has a stable composition and is easy to prepare, thus is suitable for large-scale production. The low temperature co-fired ceramic prepared from the low temperature co-fired ceramic composite material not only has excellent dielectric properties, but also has a low sintering temperature, a low thermal expansion coefficient, and high insulation resistance. It can also be co-fired with a silver electrode while maintaining good electrical properties. In addition, by adjusting the relative amounts of each component in the boroaluminosilicate mineral material, or by adjusting the ratio of the boroaluminosilicate mineral material to $Al_2O_3$, it is possible to serially regulate properties of the low temperature co-fired ceramic including dielectric properties, sintering temperature, and thermal expansion coefficient, among others. Low temperature co-fired ceramics that meet production requirements are thus produced. A composite substrate made from the low temperature co-fired ceramic show no obvious warpage or deformation after sintering; it has a flexural strength of ≥159 MPa, excellent mechanical properties, and is well-matched with the LTCC process. Thus, the boroaluminosilicate mineral material has excellent properties and is suitable for use as a low dielectric substrate material in the field of LTCC package substrates.

In one of the embodiments, the boroaluminosilicate mineral material comprises the following components:

| | |
|---|---|
| $Na_2O$ | 0.62%-0.98%; |
| $K_2O$ | 14.96%-22.80%; |
| CaO | 1.82%-4.10%%; |
| $Al_2O_3$ | 0-2.22%; |
| $B_2O_3$ | 14.87%-18.33%%; |
| $SiO_2$ | 53.47%-67.17%. |

A low temperature co-fired ceramic composite material, comprising, in mass percentages, 35% to 65% of $Al_2O_3$ and 35% to 65% of the boroaluminosilicate mineral material.

In one of the embodiments, the low temperature co-fired ceramic composite material comprises 41.69% to 62.53% of $Al_2O_3$ and 37.47% to 58.31% of the boroaluminosilicate mineral material.

A method for preparing a boroaluminosilicate mineral material, which comprises the following steps:

weighing a sodium source, a potassium source, a calcium source, an aluminum source, a boron source, and a silicon source according to a ratio of elements of the boroaluminosilicate mineral material according to any one of claims 1 to 2; mixing and grinding to obtain a boroaluminosilicate mineral grinding slurry;

subjecting the boroaluminosilicate mineral grinding slurry to a drying process to obtain a dry powder;

adding a binder to the dry powder and mixing thoroughly to obtain a mixed powder;

calcinating the mixed powder at 700° C. to 850° C. to obtain the boroaluminosilicate mineral material.

In one of the embodiments, the grinding is ball milling and a ball-milling medium is absolute ethanol.

In one of the embodiments, the grinding takes from 2 h to 8 h.

In one of the embodiments, the drying process is oven-drying, a temperature for the drying process is from 70° C. to 100° C.

In one of the embodiments, the binder is selected from at least one of polyvinyl alcohol and polyvinyl butyral.

In one of the embodiments, the step of calcinating the mixed powder at 700° C. to 850° C. specifically comprises placing the mixed powder in a muffle furnace and calcinating in the air for 1 h to 5 h.

A method for preparing a low temperature co-fired ceramic composite material, which comprises the following steps:

mixing the following components expressed in mass percentage: 35%-65% of $Al_2O_3$ and 35%-65% of the boroaluminosilicate mineral material, followed by grinding to obtain a mixed grinding slurry;

drying the mixed grinding slurry to obtain the low temperature co-fired ceramic composite material.

A low temperature co-fired ceramic made from the low temperature co-fired ceramic composite material.

A method for preparing a low temperature co-fired ceramic, which comprises the following steps:

adding a binder to the low temperature co-fired ceramic composite material, mixing to obtain a ceramic powder;

keeping the ceramic powder at 500° C. to 600° C. for debinding;

sintering the ceramic powder after the debinding at 850° C. to 950° C. to obtain the low temperature co-fired ceramic.

A composite substrate which is made from the low temperature co-fired ceramic.

DETAILED DESCRIPTION OF THE ILLUSTRATED EMBODIMENTS

Figure 1:
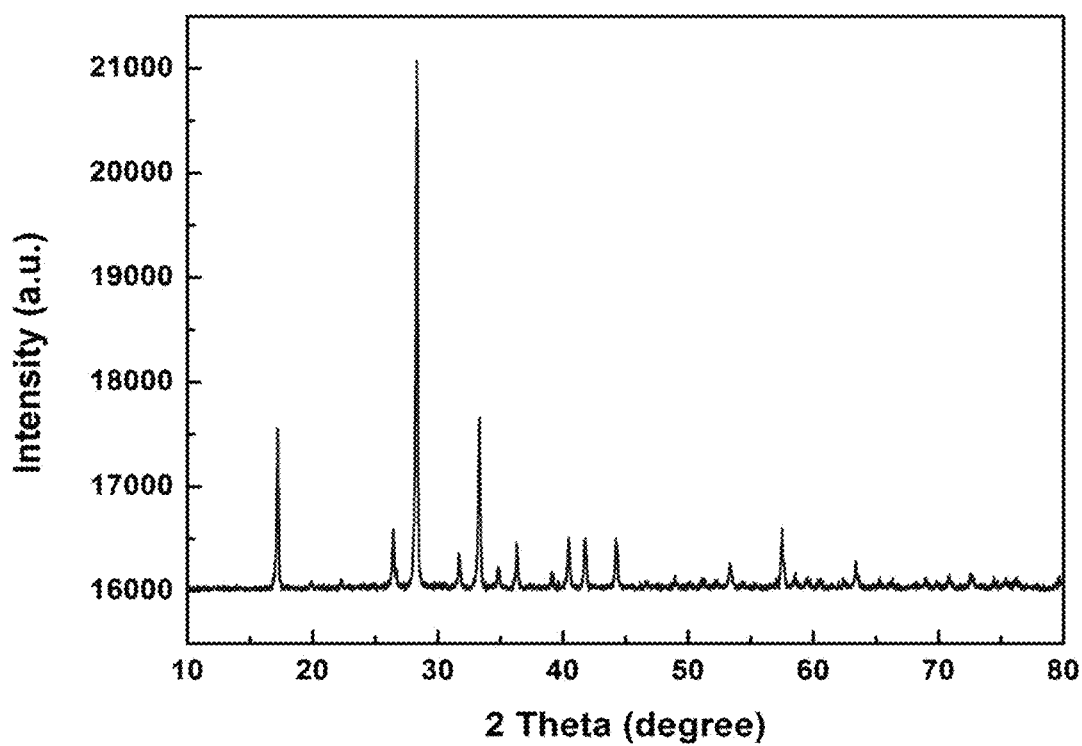
FIG. 1 is a typical XRD pattern of the boroaluminosilicate mineral material of embodiment 1.

Hereinafter, the boroaluminosilicate mineral material, the low temperature co-fired ceramic composite material, the low temperature co-fired ceramic composite substrate, and the preparation methods thereof will be further described in detail with reference to the specific embodiments and the accompanying drawings.

An embodiment of the boroaluminosilicate mineral material comprises the following components expressed in mass percentages of the following oxides:

$Na_2O$ 0.41%-1.15%;

$K_2O$ 14.15%-23.67%;

CaO 1.17%-4.10%;

$Al_2O_3$ 0-2.56%;

$B_2O_3$ 13.19%-20.00%;

$SiO_2$ 53.47%-67.17%.

The boroaluminosilicate mineral material above can be used as an additive for low temperature co-fired ceramics.

$Na_2O$ mainly promotes melting and can also improve the light transmittance of ceramics. However, a $Na_2O$ content that is too high would drastically lower the firing temperature and the thermal stability of the ceramic. Preferably, the mass percentage of $Na_2O$ is from 0.62% to 0.98%.

$K_2O$ mainly promotes melting and can also improve the light transmittance of ceramics. However, a $K_2O$ content that is too high would drastically lower the firing temperature and the thermal stability of the ceramic. Preferably, the mass percentage of $K_2O$ is from 14.96% to 22.80%.

CaO mainly promotes melting. It can also improve the thermal stability, mechanical strength, whiteness and light transmittance of the ceramic. Preferably, the mass percentage of CaO is from 1.82% to 4.10%.

$Al_2O_3$ can improve the physicochemical properties, mechanical strength, whiteness, and firing temperature of the ceramic. However, an $Al_2O_3$ content that is too high may increase the difficulty for the ceramic to be fully fired, whereas an $Al_2O_3$ content that is too low may result in a ceramic product that is prone to deform or collapse. Preferably, the mass percentage of $Al_2O_3$ is from 0% to 2.22%.

$B_2O_3$ mainly promotes melting. It can reduce the viscosity of the liquid phase during high-temperature sintering, promoting liquid phase flow during sintering, forming a microstructure that is both uniform and dense. This helps to reduce the dielectric loss of the boroaluminosilicate mineral material. Preferably, the mass percentage of $B_2O_3$ is from 14.87% to 18.33%.

$SiO_2$ is the main component of the ceramic, directly affecting the strength and other properties of the ceramic. However, a $SiO_2$ content that is too high would deteriorate the thermal stability of the ceramic, and thus the ceramic would be prone to cracking.

The ratio of the components of the aforementioned boroaluminosilicate mineral material is adequate. As a result, the boroaluminosilicate mineral material is chemically stable and can be used as a raw material for producing a low temperature co-fired ceramic having excellent dielectric properties.

The preparation method of the aforementioned boroaluminosilicate mineral material comprises the following steps:

Step S110: weighing a sodium source, a potassium source, a calcium source, an aluminum source, a boron source, and a silicon source according to a ratio of elements of the boroaluminosilicate mineral material; mixing and grinding to obtain a boroaluminosilicate mineral grinding slurry.

The sodium source, potassium source, calcium source, aluminum source, boron source, and silicon source weighed are the raw materials for preparing the boroaluminosilicate mineral material.

In one embodiment, the sodium source is selected from at least one of sodium carbonate and sodium oxide. Of course, the sodium source is not limited to sodium carbonate and sodium oxide as long as it can form sodium oxide after calcination without introducing other impurities.

In one embodiment, the potassium source is selected from at least one of potassium carbonate and potassium oxide. Of course, the potassium source is not limited to potassium carbonate and potassium oxide as long as it can form potassium oxide after calcination without introducing other impurities.

In one embodiment, the calcium source is selected from at least one of calcium carbonate and calcium oxide. Of course, the calcium source is not limited to calcium carbonate and calcium oxide as long as calcium oxide can be formed after calcination without introducing other impurities.

In one of the embodiments, the aluminum source is aluminum oxide. Of course, the aluminum source is not limited to aluminum oxide as long as aluminum oxide can be formed after calcination without introducing other impurities.

In one embodiment, the boron source is selected from at least one of boric acid and boron oxide. Of course, the boron source is not limited to boric acid and boron oxide as long as boron oxide can be formed after calcination without introducing other impurities.

In one of the embodiments, the silicon source is silicon dioxide. Of course, the silicon source is not limited to silicon dioxide as long as silicon dioxide can be formed after calcination without introducing other impurities.

In one embodiment, a potassium source, a calcium source, an aluminum source, a boron source, and a silicon source are weighed according to a ratio of elements of the boroaluminosilicate mineral material and are used as raw materials. The raw materials are expressed in mass percentages, including:

$Na_2CO_3$ 0.58%-1.58%;

$K_2CO_3$ 17.60%-27.89%;

$CaCO_3$ 1.60%-4.38%;

$Al_2O_3$ 0-2.06%;

$H_3BO_3$ 18.82%-31.16%;

$SiO_2$ 42.00%-55.78%.

Preferably, the mass percentage of $Na_2CO_3$ is from 0.88% to 1.38%.

Preferably, the mass percentage of $K_2CO_3$ is from 18.24% to 26.28%.

Preferably, the mass percentage of $CaCO_3$ is from 2.70% to 4.13%.

Preferably, the mass percentage of $Al_2O_3$ is from 0 to 1.74%.

Preferably, the mass percentage of $H_3BO_3$ is from 21.94% to 25.58%.

In one of the embodiments, the raw materials, such as the sodium source, the potassium source, the calcium source, the aluminum source, the boron source, and the silicon source are mixed by a mixing device. In one of the embodiments, the mixing device is a mixing machine.

In one of the embodiments, mixing time is from 4 h to 8 h.

In one of the embodiments, the grinding process is ball milling and the ball-milling medium is absolute ethanol. In one of the embodiments, the ratio of the added amount of anhydrous ethanol to the mass of the raw materials is from 1:1 to 1.2:1.

In one of the embodiments, the grinding process takes from 2 h to 8 h.

In one of the embodiments, the ball milling process is a planetary ball milling process.

In one embodiment, the device for ball milling is a ball mill and the balls used in ball milling are zirconia balls. Preferably, the mass ratio of the zirconia balls to the raw materials is from 3:1 to 4:1; the diameter of the zirconia ball is from 0.3 cm to 0.5 cm.

In one of the embodiments, the ball milling process has a rotational speed of 160 r/min to 200 r/min.

Step S120: subjecting the boroaluminosilicate mineral grinding slurry to a drying process to obtain a dry powder.

In one of the embodiments, the drying process is oven-drying.

In one of the embodiments, the drying process is carried out at a temperature of from 70° C. to 100° C.

In one of the embodiments, the time for the drying process is from 10 h to 16 h.

Of course, the drying process is not limited to oven-drying, and may be air-drying, as long as the boroaluminosilicate mineral grinding slurry can be dried.

Step S130: adding a binder to the dry powder and mixing thoroughly to obtain a mixed powder.

In one of the embodiments, the binder is selected from at least one of polyvinyl alcohol and polyvinyl butyral. The polyvinyl alcohol used is generally in the form of an aqueous solution, the polyvinyl butyral used is generally in the form of an anhydrous ethanol solution. Preferably, the mass concentration of an aqueous solution of polyvinyl alcohol is 1.5% to 8.0%; the mass concentration of an anhydrous ethanol solution of polyvinyl butyral is 1.5% to 8.0%.

In one of the embodiments, the mass ratio of the polyvinyl alcohol to the dry powder is from 0.012:1 to 0.03:1.

In one of the embodiments, the mass ratio of polyvinyl butyral to the dry powder is from 0.012:1 to 0.03:1.

In one of the embodiments, the dry powder is mixed with the binder using a mixing device. Preferably, the mixing device is a mixing machine.

Step S140: granulating the mixed powder to obtain boroaluminosilicate mineral particles.

In one of the embodiments, the boroaluminosilicate mineral particles have a particle size of from 5 μm to 20 μm.

In one of the embodiments, the mixed powder is granulated using a granulation device. Preferably, the granulation device is a spray granulator. Further, the material processing capacity of the spray granulator is 10 kg/h. Further, the material feed temperature of the spray granulator is from 300° C. to 350° C. Further, the outlet temperature of the spray granulator is from 80° C. to 120° C. Further, the inlet hot air temperature of the spray granulator is from 250° C. to 300° C. Further, the outlet hot air temperature of the drying chamber of the spray granulator is from 100° C. to 120° C. Further, the gas-liquid contact mode of the spray granulator is cocurrent. Further, the spraying of the spray granulator is by a spraying disk. Further, the product of the spray granulator is recovered at three points: the bottom of the main tower, the separator, and the dust collector.

Step S150: subjecting the boroaluminosilicate mineral particles to dry pressing to obtain a boroaluminosilicate mineral biscuit.

In one of the embodiments, the dry pressing is uniaxial dry pressing.

In one of the embodiments, the boroaluminosilicate mineral biscuit is disk-shaped. Of course, the boroaluminosilicate mineral biscuit is not limited to a disk shape; it may be square-shaped, spherical or the like, as long as it can be calcined.

Step S160: calcinating the boroaluminosilicate mineral material biscuit at 700° C. to 850° C.; cooling to obtain a boroaluminosilicate clay body.

In one of the embodiments, the boroaluminosilicate mineral biscuit is placed in a muffle furnace for calcination.

In one of the embodiments, the calcination is carried out in the air.

In one of the embodiments, the calcination time is from 1 h to 5 h.

In one of the embodiments, the cooling is furnace cooling. Of course, it is also possible to use a cooling device for cooling as long as the temperature of the calcined boroaluminosilicate mineral material can be lowered.

Step S170: pulverizing the boroaluminosilicate mineral clay body; sieving to obtain a boroaluminosilicate mineral material.

In one of the embodiments, the boroaluminosilicate mineral clay body is pulverized by a pulverizing device. Preferably, the pulverizing device is a pulverizing machine.

In one of the embodiments, the pulverized boroaluminosilicate mineral clay body is sieved using a sieving device. Preferably, the sieving device is a sieving machine.

In one of the embodiments, the boroaluminosilicate mineral material has a particle size of from 0.5 μm to 5 μm.

It should be noted that in the present embodiment, the boroaluminosilicate mineral biscuit is pulverized to obtain a boroaluminosilicate mineral material in powder form. Of course, in other embodiments, the mixed powder can be directly calcined at 700° C.-850° C., and then cooled to obtain the boroaluminosilicate mineral material. It can be thus understood that steps S140 and S150 can be omitted, and in this case, the mixed powder is directly calcined at 700° C. to 850° C. to obtain a boroaluminosilicate mineral material. If the particle size of the calcined boroaluminosilicate mineral powder meets requirements, the sieving may not be necessary. It can thus be understood that step S170 can also be omitted.

The preparation method of the boroaluminosilicate mineral material above has an adequate design. By introducing the step of calcining the clay body after dry pressing, the evaporation of boron and potassium from the boroaluminosilicate mineral material during the calcination process can be suppressed, and thus lowering the evaporation rates of boron and potassium.

An embodiment of the low temperature co-fired ceramic composite material comprises the following components in mass percentage: 35% to 65% of $Al_2O_3$ and 35% to 65% of the aforementioned boroaluminosilicate mineral material.

Preferably, the mass percentage of $Al_2O_3$ is from 41.69% to 62.53%.

Preferably, the mass percentage of the boroaluminosilicate mineral material is from 37.47% to 58.31%.

In one embodiment, the ceramic composite material has a particle size of from 0.5 μm to 5 μm.

The low temperature co-fired ceramic composite material is prepared by mixing the aforementioned boroaluminosilicate mineral material with $Al_2O_3$. It has a stable composition and is easy to prepare, thus is suitable for large-scale production.

The preparation method of the aforementioned low temperature co-fired ceramic composite material comprises the following steps:

Step S210: mixing the following components expressed in mass percentage: 35%-65% of $Al_2O_3$ and 35%-65% of the aforementioned boroaluminosilicate mineral material, followed by grinding to obtain a mixed grinding slurry.

$Al_2O_3$ and the boroaluminosilicate mineral material are the raw materials for preparing the low temperature co-fired ceramic composite material.

Preferably, the mass percentage of $Al_2O_3$ is from 41.69% to 62.53%.

Preferably, the mass percentage of the boroaluminosilicate mineral material is from 37.47% to 58.31%.

In one of the embodiments, the grinding process is ball milling and the ball-milling medium is absolute ethanol.

In one of the embodiments, the mass ratio of the added amount anhydrous ethanol to the mass of the raw materials for preparing the low temperature co-fired ceramic composite material is 1:1 to 1.2:1.

In one of the embodiments, the grinding process lasts from 2 h to 8 h.

In one of the embodiments, the ball milling process is a planetary ball milling process.

In one of the embodiments, $Al_2O_3$ and the boroaluminosilicate mineral material are mixed using a mixing device. In one of the embodiments, the mixing time is from 4 h to 8 h. Preferably, the mixing device is a mixing machine.

Step S220: drying the mixed grinding slurry to obtain a low temperature co-fired ceramic composite material.

In one embodiment, the drying process is oven-drying, the drying temperature is from 70° C. to 100° C.

In one of the embodiments, the time for the drying process is from 10 h to 16 h.

Of course, the drying process is not limited to oven-drying, and may be air-drying, as long as the boroaluminosilicate mineral grinding slurry can be dried.

An embodiment of the low temperature co-fired ceramic is made from the aforementioned low temperature co-fired ceramic composite material.

The aforementioned low temperature co-fired ceramic not only has excellent dielectric properties, but also has a low sintering temperature, a low thermal expansion coefficient, and a high insulation resistance. It can also be co-fired with a silver electrode while maintaining good electrical properties. In addition, by adjusting the relative amounts of each component in the boroaluminosilicate mineral material, or by adjusting the ratio of the boroaluminosilicate mineral material to $Al_2O_3$, it is possible to serially regulate properties of the low temperature co-fired ceramic, including dielectric properties, sintering temperature, and thermal expansion coefficient, among others. Low temperature co-fired ceramics that meet production requirements are thus produced.

The preparation method of the aforementioned low temperature co-fired ceramic comprises the following steps:

Step S310: adding a binder to the low temperature co-fired ceramic composite material, mixing to obtain a ceramic powder.

In one of the embodiments, the binder is selected from at least one of polyvinyl alcohol and polyvinyl butyral. The polyvinyl alcohol used is generally in the form of an aqueous solution, the polyvinyl butyral used is generally in the form of an anhydrous ethanol solution. Preferably, the mass concentration of an aqueous solution of polyvinyl alcohol is 1.5% to 8.0%; the mass concentration of an anhydrous ethanol solution of polyvinyl butyral is 1.5% to 8.0%.

In one of the embodiments, the mass ratio of the polyvinyl alcohol to the low temperature co-fired ceramic composite material is from 0.012:1 to 0.03:1.

In one of the embodiments, the mass ratio of polyvinyl butyral to the low temperature co-fired ceramic composite material is from 0.012:1 to 0.03:1.

In one of the embodiments, the dry powder is mixed with the binder using a mixing device. Preferably, the mixing device is a mixing machine.

Step S320: granulating the ceramic powder to obtain ceramic particles.

In one embodiment, the ceramic particles have a particle size of from 5 μm to 20 μm.

In one of the embodiments, the ceramic powder is granulated using a granulation device. Preferably, the granulation device is a spray granulator. Further, the material processing capacity of the spray granulator is 10 kg/h. Further, the material feed temperature of the spray granulator is from 300° C. to 350° C. Further, the outlet temperature of the spray granulator is from 80° C. to 120° C. Further, the inlet hot air temperature of the spray granulator is from 250° C. to 300° C. Further, the outlet hot air temperature of the drying chamber of the spray granulator is from 100° C. to 120° C. Further, the gas-liquid contact mode of the spray granulator is cocurrent. Further, the spraying of the spray granulator is by a spraying disk. Further, the product of the spray granulator is recovered at three points: the bottom of the main tower, the separator, and the dust collector.

Step S330: subjecting the ceramic particles to dry pressing to obtain a ceramic clay body.

In one of the embodiments, the dry pressing is uniaxial dry pressing.

In one of the embodiments, the boroaluminosilicate mineral biscuit is disk-shaped. The boroaluminosilicate mineral biscuit is made into a disk shape to facilitate the measurement of dielectric properties of the low temperature co-fired ceramic.

Step S340: keeping the ceramic clay body at 500° C. to 600° C. for debinding.

In one embodiment, the debinding lasts for 2 h to 3 h.

In one embodiment, a muffle furnace is used for the debinding.

Step S350: sintering the ceramic clay body obtained after debinding at 850° C. to 950° C., followed by cooling to obtain the low temperature co-fired ceramic.

In one of the embodiments, sintering time is from 1 h to 2 h.

In one of the embodiments, the ceramic clay body is sintered in a muffle furnace.

In one of the embodiments, the cooling is furnace cooling.

It should be noted that in the present embodiment, the ceramic powder is granulated and then dry-pressed to obtain a ceramic clay body; the ceramic clay body is subjected to debinding and then sintered to obtain a low temperature co-fired ceramic. Of course, in other embodiments, the ceramic powder obtained in step S310 can be directly subjected to debinding; after sintering, the low temperature co-fired ceramic can be obtained. It can be thus understood that steps S320 and S330 can be omitted; in this case, the ceramic powder is directly subjected to debinding. After sintering, a low temperature co-fired ceramic in powder form is obtained.

An embodiment of the composite substrate is made from the aforementioned low temperature co-fired ceramic.

The aforementioned composite substrate showed no obvious warpage or deformation after sintering; it has a flexural strength of ≥159 MPa, excellent mechanical properties, and is well-matched with the LTCC process.

The invention will be further described below with reference to the following embodiments.

Embodiment 1

0.52 g of $Na_2CO_3$, 10.92 g of $K_2CO_3$, 1.51 g of $CaCO_3$, 12.43 g of $H_3BO_3$ and 24.63 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material.

A typical XRD pattern of the boroaluminosilicate mineral material as shown in FIG. 1 was obtained by X-ray diffraction. As can be seen from FIG. 1, the boroaluminosilicate mineral material is a crystal phase mineral powder having a homogeneous chemical composition and no component segregation.

The composition of the boroaluminosilicate mineral material was determined by inductively coupled plasma optical emission spectroscopy (ICP-OES). The composition of the boroaluminosilicate mineral material is shown in Table 1, expressed in mass percentage.

TABLE 1

| Oxides | $Na_2O$ | $K_2O$ | CaO | $Al_2O_3$ | $B_2O_3$ | $SiO_2$ |
|---|---|---|---|---|---|---|
| wt % | 0.75 | 18.50 | 2.10 | 0 | 17.40 | 61.25 |

50.03 g of $Al_2O_3$ and 49.97 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material.

Figure 2:
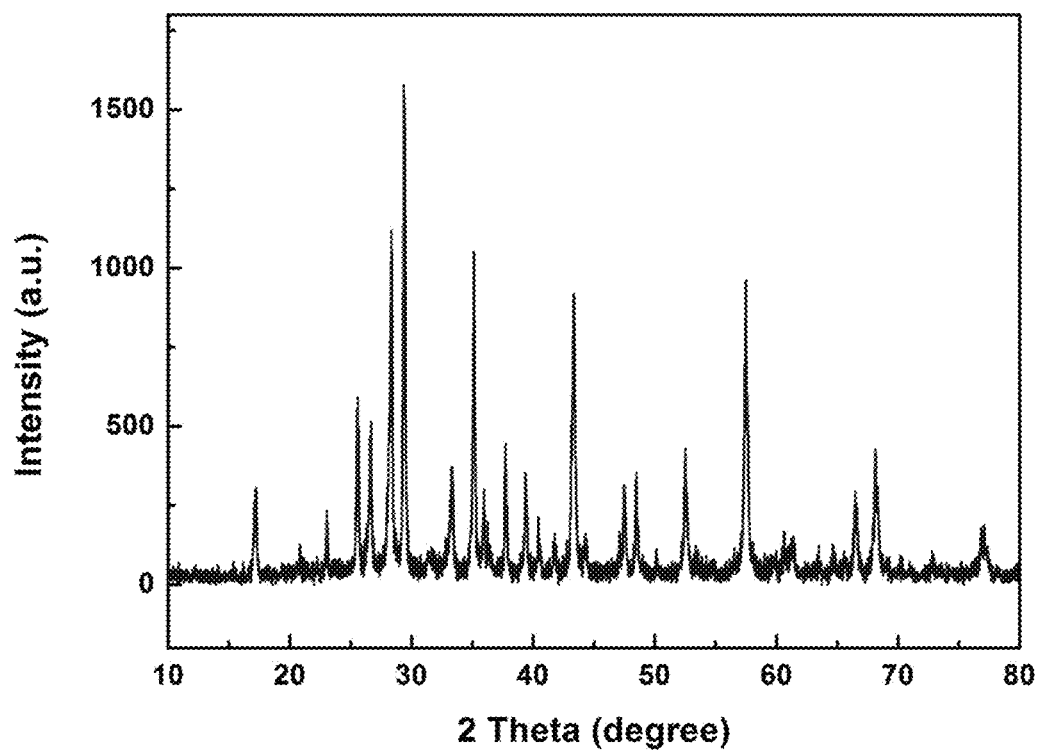
FIG. 2 is a typical XRD pattern of the low temperature co-fired ceramic composite material of embodiment 1.
Figure 3:
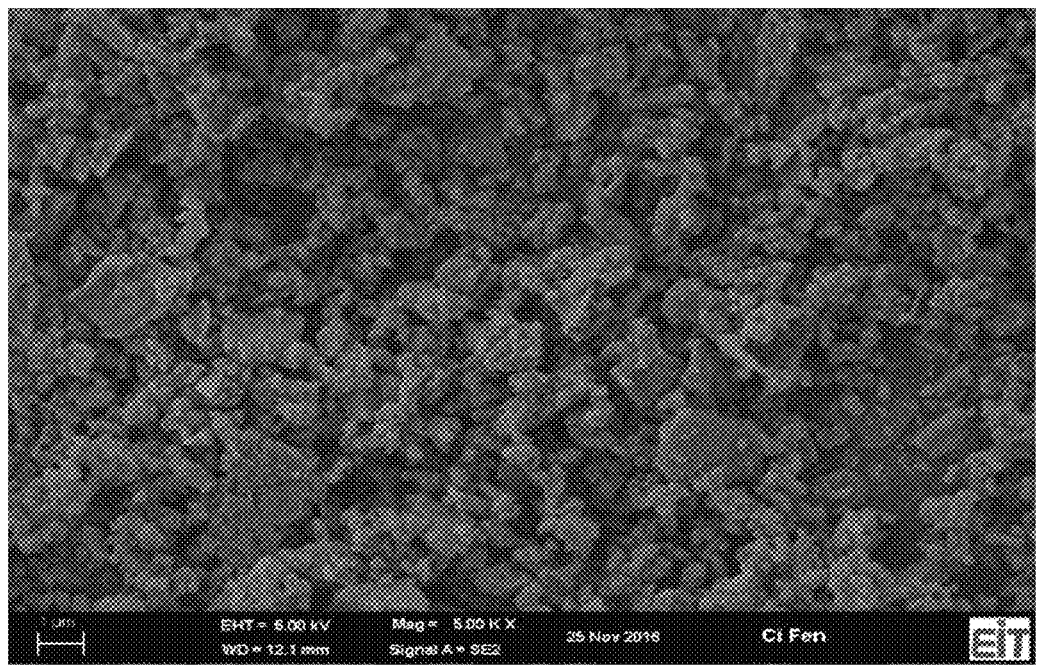
FIG. 3 is a 5000× magnified SEM image of the low temperature co-fired ceramic composite material of embodiment 1.

A typical XRD pattern of the low temperature co-fired ceramic composite material as shown in FIG. 2 was obtained by X-ray diffraction. As can be seen from FIG. 2, the low temperature co-fired ceramic material has a multiphase ceramic structure formed from aluminum oxide and boroaluminosilicate. The low temperature co-fired ceramic composite material was subjected to scanning electron microscopic analysis to obtain a 5000× magnified SEM image as shown in FIG. 3. It can be seen from FIG. 3 that the low temperature co-fired ceramic composite material has uniform morphology and is composed of uniformly sized small particles and uniformly sized large particles. Among them, the small particles are mainly aluminum oxide, their average particle size is about 0.5 μm; the large particles are mainly pulverized boroaluminosilicate mineral materials, their average particle size is about 2 μm.

Figure 4:
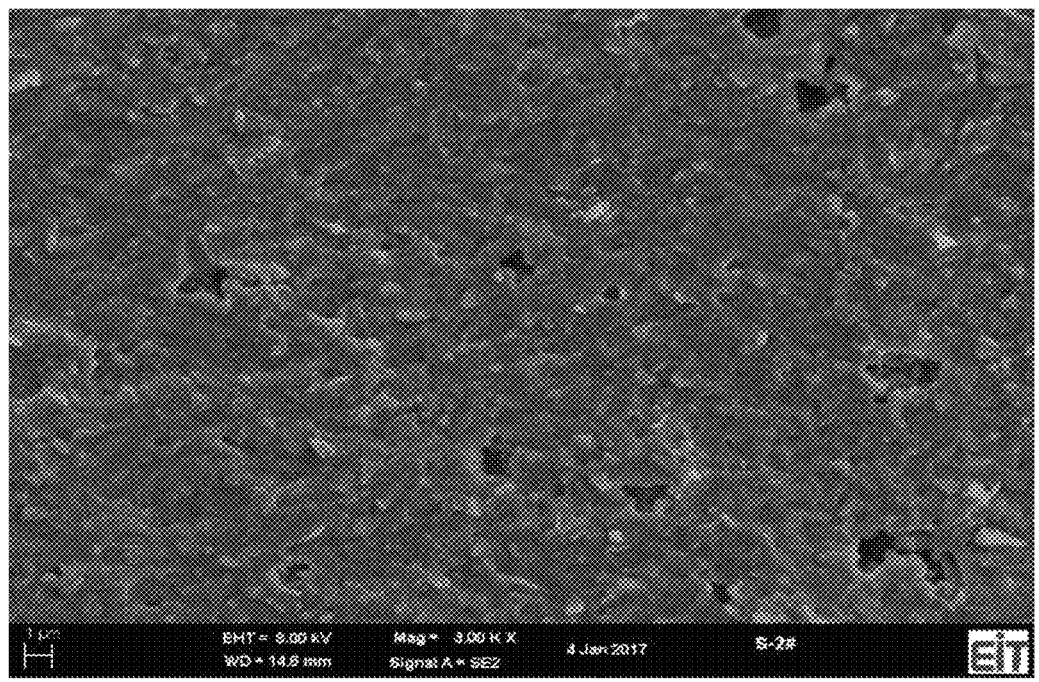
FIG. 4 is a 3000× magnified SEM image of a cross-section of the low temperature co-fired ceramic of embodiment 1.

2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic. The low temperature co-fired ceramic was subjected to scanning electron microscopic analysis to obtain a 3000× magnified SEM image of its cross-section shown in FIG. 4. It can be seen from FIG. 4 that the low temperature co-fired ceramic has a compact cross-sectional structure; the crystallized aluminum oxide grains are uniformly coated by a continuous phase material formed by the boroaluminosilicate mineral. The average grain size of the aluminum oxide is about 1 μm.

Embodiment 2

0.50 g of $Na_2CO_3$, 10.71 g of $K_2CO_3$, 2.93 g of $CaCO_3$, 0.34 g of $Al_2O_3$, 11.42 g of $H_3BO_3$ and 24.09 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 2, expressed in mass percentage. The method for determining the composition of the boroaluminosilicate mineral material is the same as in embodiment 1.

TABLE 2

| Oxides | $Na_2O$ | $K_2O$ | CaO | $Al_2O_3$ | $B_2O_3$ | $SiO_2$ |
|---|---|---|---|---|---|---|
| wt % | 0.73 | 18.20 | 4.10 | 0.86 | 16.04 | 60.07 |

50.03 g of $Al_2O_3$ and 49.97 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 3

0.52 g of $Na_2CO_3$, 10.96 g of $K_2CO_3$, 2.94 g of $CaCO_3$, 0.76 g of $Al_2O_3$, 11.05 g of $H_3BO_3$ and 23.77 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 3, expressed in mass percentage. The method for determining the composition of the boroaluminosilicate mineral material is the same as in embodiment 1.

TABLE 3

| Oxides | $Na_2O$ | $K_2O$ | CaO | $Al_2O_3$ | $B_2O_3$ | $SiO_2$ |
|---|---|---|---|---|---|---|
| wt % | 0.76 | 18.60 | 4.10 | 1.90 | 15.48 | 59.16 |

50.03 g of $Al_2O_3$ and 49.97 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 4

0.62 g of $Na_2CO_3$, 13.17 g of $K_2CO_3$, 2.34 g of $CaCO_3$, 0.17 g of $Al_2O_3$, 11.00 g of $H_3BO_3$ and 23.69 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 70° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 5 h. Then, it was furnace cooled, pulverized, and sieved to obtain a boroaluminosilicate mineral material. The composition of the boroaluminosilicate mineral material is shown in Table 4, expressed in mass percentage. The method for determining the composition of the boroaluminosilicate mineral material is the same as in embodiment 1.

TABLE 4

| Oxides | $Na_2O$ | $K_2O$ | CaO | $Al_2O_3$ | $B_2O_3$ | $SiO_2$ |
|---|---|---|---|---|---|---|
| wt % | 0.41 | 14.15 | 1.17 | 0 | 20.00 | 64.27 |

50.03 g of $Al_2O_3$ and 49.97 g of the boroaluminosilicate mineral material were weighed and mixed. Then, it was added to the planetary ball mill with 120 mL of absolute ethanol and ball-milled for 2 h to obtain a mixed grinding slurry. The mixed grinding slurry was dried at 70° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 850° C. for 1 h and was furnace cooled to room temperature to obtain the low temperature co-fired ceramic.

Embodiment 5

0.79 g of $Na_2CO_3$, 13.95 g of $K_2CO_3$, 2.19 g of $CaCO_3$, 1.03 g of $Al_2O_3$, 9.41 g of $H_3BO_3$ and 22.64 g of $SiO_2$ were weighed, mixed with 60 mL of absolute ethanol, and added to a planetary ball mill for 8 hours of ball milling to obtain a boroaluminosilicate mineral grinding slurry. The boroaluminosilicate mineral grinding slurry was oven-dried at 75° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 850° C. for 1 h. Then, it was furnace cooled, pulverized, and sieved to obtain a boroaluminosilicate mineral material. The composition of the boroaluminosilicate mineral material is shown in Table 5, expressed in mass percentage. The method for determining the composition of the boroaluminosilicate mineral material is the same as in embodiment 1.

TABLE 5

| Oxides | $Na_2O$ | $K_2O$ | CaO | $Al_2O_3$ | $B_2O_3$ | $SiO_2$ |
|---|---|---|---|---|---|---|
| wt % | 1.15 | 23.67 | 3.05 | 2.56 | 13.19 | 56.38 |

50.03 g of $Al_2O_3$ and 49.97 g of the boroaluminosilicate mineral material were weighed and mixed. Then, it was added to the planetary ball mill with 120 mL of absolute ethanol and ball-milled for 8 h to obtain a mixed grinding slurry. The mixed grinding slurry was dried at 75° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 600° C. for 3 h for debinding. The ceramic body after debinding was sintered at 950° C. for 2 h and was furnace cooled to room temperature to obtain the low temperature co-fired ceramic.

Embodiment 6

0.38 g of $Na_2CO_3$, 9.79 g of $K_2CO_3$, 1.30 g of $CaCO_3$, 0.09 g of $Al_2O_3$, 12.35 g of $H_3BO_3$ and 26.08 g of $SiO_2$ were weighed, mixed with 60 mL of absolute ethanol, and added to a planetary ball mill for 3 hours of ball milling to obtain a boroaluminosilicate mineral grinding slurry. The boroaluminosilicate mineral grinding slurry was oven-dried at 80° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 730° C. for 2 h. Then, it was furnace cooled, pulverized, and sieved to obtain a boroaluminosilicate mineral material. The composition of the boroaluminosilicate mineral material is shown in Table 6, expressed in mass percentage. The method for determining the composition of the boroaluminosilicate mineral material is the same as in embodiment 1.

TABLE 6

| Oxides | $Na_2O$ | $K_2O$ | CaO | $Al_2O_3$ | $B_2O_3$ | $SiO_2$ |
|---|---|---|---|---|---|---|
| wt % | 0.55 | 16.37 | 1.79 | 0.23 | 17.06 | 64.00 |

50.03 g of $Al_2O_3$ and 49.97 g of the boroaluminosilicate mineral material were weighed and mixed. Then, it was added to the planetary ball mill with 120 mL of absolute ethanol and ball-milled for 3 h to obtain a mixed grinding slurry. The mixed grinding slurry was dried at 80° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 520° C. for 2.5 h for debinding. The ceramic body after debinding was sintered at 870° C. for 1.5 h and was furnace cooled to room temperature to obtain the low temperature co-fired ceramic.

Embodiment 7

0.69 g of $Na_2CO_3$, 12.55 g of $K_2CO_3$, 1.73 g of $CaCO_3$, 0.80 g of $Al_2O_3$, 11.65 g of $H_3BO_3$ and 22.58 g of $SiO_2$ were weighed, mixed with 60 mL of absolute ethanol, and added to a planetary ball mill for 5 hours of ball milling to obtain a boroaluminosilicate mineral grinding slurry. The boroaluminosilicate mineral grinding slurry was oven-dried at 85° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 3 h. Then, it was furnace cooled, pulverized, and sieved to obtain a boroaluminosilicate mineral material. The composition of the boroaluminosilicate mineral material is shown in Table 7, expressed in mass percentage. The method for determining the composition of the boroaluminosilicate mineral material is the same as in embodiment 1.

TABLE 7

| Oxides | $Na_2O$ | $K_2O$ | CaO | $Al_2O_3$ | $B_2O_3$ | $SiO_2$ |
|---|---|---|---|---|---|---|
| wt % | 1.01 | 21.45 | 2.43 | 2.01 | 16.46 | 56.64 |

50.03 g of $Al_2O_3$ and 49.97 g of the boroaluminosilicate mineral material were weighed and mixed. Then, it was added to the planetary ball mill with 120 mL of absolute ethanol and ball-milled for 5 h to obtain a mixed grinding slurry. The mixed grinding slurry was dried at 85° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 540° C. for 3 h for debinding. The ceramic body after debinding was sintered at 890° C. for 2 h and was furnace cooled to room temperature to obtain the low temperature co-fired ceramic.

Embodiment 8

0.66 g of $Na_2CO_3$, 13.14 g of $K_2CO_3$, 1.54 g of $CaCO_3$, 0.87 g of $Al_2O_3$, 12.79 g of $H_3BO_3$ and 21.00 g of $SiO_2$ were weighed, mixed with 60 mL of absolute ethanol, and added to a planetary ball mill for 6 hours of ball milling to obtain a boroaluminosilicate mineral grinding slurry. The boroaluminosilicate mineral grinding slurry was oven-dried at 90° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 780° C. for 4 h. Then, it was furnace cooled, pulverized, and sieved to obtain a boroaluminosilicate mineral material. The composition of the boroaluminosilicate mineral material is shown in Table 8, expressed in mass percentage. The method for determining the composition of the boroaluminosilicate mineral material is the same as in embodiment 1.

TABLE 8

| Oxides | $Na_2O$ | $K_2O$ | CaO | $Al_2O_3$ | $B_2O_3$ | $SiO_2$ |
|---|---|---|---|---|---|---|
| wt % | 0.98 | 22.80 | 2.20 | 2.22 | 18.33 | 53.47 |

50.03 g of $Al_2O_3$ and 49.97 g of the boroaluminosilicate mineral material were weighed and mixed. Then, it was added to the planetary ball mill with 120 mL of absolute ethanol and ball-milled for 6 h to obtain a mixed grinding slurry. The mixed grinding slurry was dried at 90° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 3 h for debinding. The ceramic body after debinding was sintered at 900° C. for 2 h and was furnace cooled to room temperature to obtain the low temperature co-fired ceramic.

Embodiment 9

0.44 g of $Na_2CO_3$, 9.12 g of $K_2CO_3$, 1.35 g of $CaCO_3$, 0.23 g of $Al_2O_3$, 10.97 g of $H_3BO_3$ and 27.89 g of $SiO_2$ were weighed, mixed with 60 mL of absolute ethanol, and added to a planetary ball mill for 7 hours of ball milling to obtain a boroaluminosilicate mineral grinding slurry. The boroaluminosilicate mineral grinding slurry was oven-dried at 95° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 800° C. for 3 h. Then, it was furnace cooled, pulverized, and sieved to obtain a boroaluminosilicate mineral material. The composition of the boroaluminosilicate mineral material is shown in Table 9, expressed in mass percentage. The method for determining the composition of the boroaluminosilicate mineral material is the same as in embodiment 1.

TABLE 9

| Oxides | $Na_2O$ | $K_2O$ | CaO | $Al_2O_3$ | $B_2O_3$ | $SiO_2$ |
|---|---|---|---|---|---|---|
| wt % | 0.62 | 14.96 | 1.82 | 0.56 | 14.87 | 67.17 |

50.03 g of $Al_2O_3$ and 49.97 g of the boroaluminosilicate mineral material were weighed and mixed. Then, it was added to the planetary ball mill with 120 mL of absolute ethanol and ball-milled for 7 h to obtain a mixed grinding slurry. The mixed grinding slurry was dried at 95° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 560° C. for 3 h for debinding. The ceramic body after debinding was sintered at 920° C. for 2 h and was furnace cooled to room temperature to obtain the low temperature co-fired ceramic.

Embodiment 10

0.52 g of $Na_2CO_3$, 10.92 g of $K_2CO_3$, 1.51 g of $CaCO_3$, 12.43 g of $H_3BO_3$ and 24.63 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 10, expressed in mass percentage. The method for determining the composition of the boroaluminosilicate mineral material is the same as in embodiment 1.

TABLE 10

| Oxides | $Na_2O$ | $K_2O$ | CaO | $Al_2O_3$ | $B_2O_3$ | $SiO_2$ |
|---|---|---|---|---|---|---|
| wt % | 0.75 | 18.50 | 2.10 | 0 | 17.40 | 61.25 |

62.53 g of $Al_2O_3$ and 37.47 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 11

0.52 g of $Na_2CO_3$, 10.92 g of $K_2CO_3$, 1.51 g of $CaCO_3$, 12.43 g of $H_3BO_3$ and 24.63 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 11, expressed in mass percentage. The method for determining the composition of the boroaluminosilicate mineral material is the same as in embodiment 1.

TABLE 11

| Oxides | $Na_2O$ | $K_2O$ | CaO | $Al_2O_3$ | $B_2O_3$ | $SiO_2$ |
|---|---|---|---|---|---|---|
| wt % | 0.75 | 18.50 | 2.10 | 0 | 17.40 | 61.25 |

52.66 g of $Al_2O_3$ and 47.34 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 12

0.52 g of $Na_2CO_3$, 10.92 g of $K_2CO_3$, 1.51 g of $CaCO_3$, 12.43 g of $H_3BO_3$ and 24.63 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 12, expressed in mass percentage. The method for determining the composition of the boroaluminosilicate mineral material is the same as in embodiment 1.

TABLE 12

| Oxides | $Na_2O$ | $K_2O$ | CaO | $Al_2O_3$ | $B_2O_3$ | $SiO_2$ |
|---|---|---|---|---|---|---|
| wt % | 0.75 | 18.50 | 2.10 | 0 | 17.40 | 61.25 |

44.67 g of $Al_2O_3$ and 55.33 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 13

0.52 g of $Na_2CO_3$, 10.92 g of $K_2CO_3$, 1.51 g of $CaCO_3$, 12.43 g of $H_3BO_3$ and 24.63 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 13, expressed in mass percentage. The method for determining the composition of the boroaluminosilicate mineral material is the same as in embodiment 1.

TABLE 13

| Oxides | $Na_2O$ | $K_2O$ | CaO | $Al_2O_3$ | $B_2O_3$ | $SiO_2$ |
|---|---|---|---|---|---|---|
| wt % | 0.75 | 18.50 | 2.10 | 0 | 17.40 | 61.25 |

41.69 g of $Al_2O_3$ and 58.31 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 14

0.52 g of $Na_2CO_3$, 10.92 g of $K_2CO_3$, 1.51 g of $CaCO_3$, 12.43 g of $H_3BO_3$ and 24.63 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 14, expressed in mass percentage. The method for determining the composition of the boroaluminosilicate mineral material is the same as in embodiment 1.

TABLE 14

| Oxides | $Na_2O$ | $K_2O$ | CaO | $Al_2O_3$ | $B_2O_3$ | $SiO_2$ |
|---|---|---|---|---|---|---|
| wt % | 0.75 | 18.50 | 2.10 | 0 | 17.40 | 61.25 |

35.00 g of $Al_2O_3$ and 65.00 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 15

0.52 g of $Na_2CO_3$, 10.92 g of $K_2CO_3$, 1.51 g of $CaCO_3$, 12.43 g of $H_3BO_3$ and 24.63 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. 2 mL of an aqueous solution of polyvinyl alcohol having a mass concentration of 8.0% was added to the dry powder to obtain a mixed powder. The mixed powder was granulated and uniaxial dry pressed to obtain a boroaluminosilicate mineral biscuit. The boroaluminosilicate mineral biscuit was added to a muffle furnace and calcined in the air at 750° C. for 2 h. Then, it was furnace cooled, pulverized, and sieved to obtain a boroaluminosilicate mineral material. The composition of the boroaluminosilicate mineral material is shown in Table 15, expressed in mass percentage. The method for determining the composition of the boroaluminosilicate mineral material is the same as in embodiment 1.

TABLE 15

| Oxides | $Na_2O$ | $K_2O$ | CaO | $Al_2O_3$ | $B_2O_3$ | $SiO_2$ |
|---|---|---|---|---|---|---|
| wt % | 0.75 | 18.50 | 2.10 | 0 | 17.40 | 61.25 |

65.00 g of $Al_2O_3$ and 35.00 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

Embodiment 16

11.38 g of $K_2CO_3$, 12.95 g of $H_3BO_3$ and 25.67 g of $SiO_2$ were weighed, mixed with 60 mL of absolute ethanol, and added to a planetary ball mill for 4 hours of ball milling to obtain a boroaluminosilicate mineral grinding slurry. The boroaluminosilicate mineral grinding slurry was oven-dried at 100° C. for 12 h to obtain a dry powder. The dry powder was directly placed in a crucible, added to a muffle furnace, and smelted at 1500° C. for 30 min by a high-temperature melting process. It was then removed from the furnace at high temperature and was quenched in deionized water, grounded and sieved to obtain a boroaluminosilicate glass powder. The composition of the boroaluminosilicate glass powder is shown in Table 16, expressed in mass percentage. The method for determining the composition of the boroaluminosilicate glass powder is the same as in embodiment 1.

TABLE 16

| Oxides | $Na_2O$ | $K_2O$ | CaO | $Al_2O_3$ | $B_2O_3$ | $SiO_2$ |
|---|---|---|---|---|---|---|
| wt % | 0 | 17.89 | 0 | 0 | 16.27 | 65.84 |

50.03 g of $Al_2O_3$ and 49.97 g of the boroaluminosilicate mineral material were weighed and mixed. Then, it was added to the planetary ball mill with 120 mL of absolute ethanol and ball-milled for 4 h to obtain a mixed grinding slurry. The mixed grinding slurry was dried at 100° C. for 12 h to obtain a low temperature co-fired ceramic composite material. 2 mL of an aqueous solution of polyvinyl alcohol having a mass concentration of 8.0% was added to the low temperature co-fired ceramic composite material and was mixed to obtain a ceramic powder. The ceramic powder was granulated and then subjected to uniaxial dry pressing to obtain a ceramic clay body. The temperature of the ceramic clay body was kept at 550° C. for 2 h for debinding. The ceramic body after debinding was sintered at 900° C. for 2 h and was furnace cooled to room temperature to obtain the low temperature co-fired ceramic.

The low temperature co-fired ceramics obtained in embodiments 1 to 16 were polished on both sides into a cylindrical sample having a diameter of 10 mm and a thickness of 5 mm. After the cylindrical sample was ultrasonically cleaned and dried, the dielectric constant and dielectric loss of the cylindrical sample were tested at 15 GMz and room temperature using a Hakki-Coleman split post dielectric resonator.

The low temperature co-fired ceramics obtained in embodiment 1 to 16 were polished on both sides into a cylindrical sample having a diameter of 10 mm and a thickness of 2 mm; silver electrode paste was brushed onto both sides and was then sintered at 750° C. for 15 minutes. Then, it was furnace cooled to room temperature to obtain a testing sample with a silver electrode thickness of 0.08 mm. The composition of the silver electrode paste includes silver powder, a resin, and a diluent. The dielectric constant and dielectric loss of the testing sample were tested at 1 MHz and room temperature by an LCR electric bridge. The model of the LCR electric bridge is Agilent HP4278A.

The insulation resistivity of the low temperature co-fired ceramics obtained in embodiments 1 to 16 were tested at room temperature using a DC insulation resistance tester. The test voltage was DC 100V; the model of the DC insulation resistance tester was Tonghui TH2681A.

The thermal expansion coefficients of the low temperature co-fired ceramics obtained in embodiments 1 to 16 were tested by a thermal expansion apparatus. The reference standard was GJB332A-2004 solid material linear expansion coefficient test method.

The low temperature co-fired ceramics obtained in embodiments 1 to 16 were subjected to sheet cutting, screen printing, stacking, isostatic pressing, cutting, and co-firing to form an LTCC substrate. The flexural strength of the LTCC substrate was tested by the three-point bending test, the reference standard was JC/T676-1997 glass material bending strength test method.

The performance parameters of the low temperature co-fired ceramics and composite substrates of embodiments 1 to 16 are shown in Table 17.

6.0 to 9.2 and a dielectric loss of ≤0.01 at a high microwave frequency of 15 GHz. It can be concluded that the low temperature co-fired ceramics prepared in embodiments 1 to 15 have low dielectric constants and low dielectric loss at both low and high frequencies and excellent dielectric properties. Meanwhile, the low temperature co-fired ceramic and the silver electrode can be co-fired while keeping good electrical properties.

Further, the low temperature co-fired ceramics obtained in embodiments 1 to 15 have a sintering temperature of 900° C., a thermal expansion coefficient of $\leq 9.89 \times 10^{-6}/°$ C., and insulation resistance of $\geq 10^{10}$ Ω·cm. It can be seen that the low temperature co-fired ceramic materials prepared in embodiments 1 to 15 have low sintering temperatures, low thermal expansion coefficients, and high insulation resistance. They satisfy the performance requirements of low dielectric LTCC materials.

It can be seen from embodiments 1 to 9 that by adjusting the relative content of each component in the boroaluminosilicate mineral material, it is possible to serially regulate properties of the low temperature co-fired ceramic, including dielectric properties, sintering temperature, and thermal expansion coefficient, among others. It can be seen from

TABLE 17

| Performance | Embodiments | | | | | | | |
|---|---|---|---|---|---|---|---|---|
| | 1 | 2 | 3 | 4 | 5 | 6 | 7 | 8 |
| Dielectric constant (1 MHz) | 7.5 | 7.5 | 7.8 | 8.7 | 9 | 7.6 | 7.8 | 7.4 |
| Dielectric loss (1 MHz) | 0.0017 | 0.0036 | 0.0049 | 0.008 | 0.0086 | 0.0067 | 0.0056 | 0.0041 |
| Dielectric constant (15 GHz) | 7.1 | 7.2 | 7.5 | 8.2 | 8.4 | 7.3 | 7.3 | 7 |
| Dielectric loss (15 GHz) | 0.0033 | 0.0045 | 0.0054 | 0.01 | 0.014 | 0.008 | 0.0065 | 0.0058 |
| Insulation resistance (Ω · cm) | $10^{11}$ | $10^{11}$ | $10^{11}$ | $10^{11}$ | $10^{10}$ | $10^{11}$ | $10^{11}$ | $10^{11}$ |
| Sintering temperature (° C.) | 900 | 900 | 900 | 900 | 900 | 900 | 900 | 900 |
| Thermal expansion coefficient ($10^{-6}/°$ C.) | 5.67 | 7.4 | 9.89 | 7.2 | 9.34 | 8.46 | 7.85 | 6.8 |
| Flexural Strength (MPa) | 212 | 193 | 180 | 180 | 175 | 184 | 177 | 159 |

| Performance | Embodiments | | | | | | | |
|---|---|---|---|---|---|---|---|---|
| | 9 | 10 | 11 | 12 | 13 | 14 | 15 | 16 |
| Dielectric constant (1 MHz) | 7.7 | 9.5 | 8.9 | 7.7 | 7.3 | 6.8 | 8.5 | 8.3 |
| Dielectric loss (1 MHz) | 0.001 | 0.0024 | 0.0020 | 0.0058 | 0.006 | 0.0096 | 0.005 | 0.025 |
| Dielectric constant (15 GHz) | 7.5 | 9.2 | 8.5 | 7.4 | 6.9 | 6.0 | 7.9 | 7.8 |
| Dielectric loss (15 GHz) | 0.0035 | 0.0061 | 0.0058 | 0.01 | 0.01 | 0.01 | 0.006 | 0.03 |
| Insulation resistance (Ω · cm) | $10^{11}$ | $10^{11}$ | $10^{11}$ | $10^{11}$ | $10^{11}$ | $10^{10}$ | $10^{11}$ | $10^{9}$ |
| Sintering temperature (° C.) | 900 | 900 | 900 | 900 | 900 | 900 | 900 | 900 |
| Thermal expansion coefficient ($10^{-6}/°$ C.) | 5.81 | 9.0 | 8.6 | 8.1 | 6.8 | 8.3 | 7.6 | 11.51 |
| Flexural Strength (MPa) | 190 | 178 | 193 | 175 | 184 | 187 | 163 | 127 |

As can be seen from Table 17, the low temperature co-fired ceramics prepared in embodiments 1 to 15 have a continuously adjustable dielectric constant of 6.8 to 9.5 and a dielectric loss of ≤0.0096 at a low frequency of 1 MHz; they have a continuously adjustable dielectric constant of embodiments 10 to 15 that by adjusting the ratio of the boroaluminosilicate mineral material to $Al_2O_3$, it is also possible to serially regulate properties of the low temperature co-fired ceramic, including dielectric properties, sintering temperature, and thermal expansion coefficient, among others. Low temperature co-fired ceramics that meet production requirements are produced as a result.

It can be seen from embodiments 1 to 15 that composite substrates made from the low temperature co-fired ceramic have a flexural strength of ≥159 MPa, excellent mechanical properties, and are well-matched with the LTCC process. They have better practicability in the field of LTCC low dielectric substrates.

It can be seen from embodiments 1 to 16 that the low temperature co-fired ceramics prepared in embodiments 1 to 15 have better dielectric properties, lower thermal expansion coefficients, higher insulation resistance, and smaller thermal expansion coefficients than that of example 16. Also, the composite substrates obtained from the low temperature co-fired ceramics of embodiments 1 to 15 have higher flexural strength than that of embodiment 16.

In summary, the boroaluminosilicate mineral material has excellent properties and is suitable for use as a low dielectric substrate material in the field of LTCC package substrates.

The technical features of the above embodiments may be arbitrarily combined. To keep the description brief, all possible combinations of the technical features in the above embodiments are not described. However, as long as there is no contradiction in the combinations of these technical features, they are considered to be within the scope of this specification.

The above embodiments merely illustrate several embodiments of the present invention. Although the description is specific and detailed, they should not be understood as limiting the scope of the invention. It should be noted that a number of variations and modifications may be made by those skilled in the art without departing from the spirit and scope of the present invention. Therefore, the scope of the invention should be determined by the appended claims.

What is claimed is:

1. A boroaluminosilicate mineral material for a low temperature co-fired ceramic, wherein the boroaluminosilicate mineral material consists of the following components expressed in mass percentages of the following oxides:

| | |
|---|---|
| $Na_2O$ | 0.41%-1.15%; |
| $K_2O$ | 14.15%-23.67%; |
| CaO | 1.17%-4.10%; |
| $Al_2O_3$ | 0-2.56%; |
| $B_2O_3$ | 13.19%-20.00%; |
| $SiO_2$ | 53.47%-67.17%. |

2. The boroaluminosilicate mineral material according to claim 1, wherein it consists of the following components:

| | |
|---|---|
| $Na_2O$ | 0.62%-0.98%; |
| $K_2O$ | 14.96%-22.80%; |
| CaO | 1.82%-4.10%%; |
| $Al_2O_3$ | 0-2.22%; |
| $B_2O_3$ | 14.87%-18.33%%; |
| $SiO_2$ | 53.47%-67.17%. |

3. A low temperature co-fired ceramic composite material, wherein the low temperature co-fired ceramic composite material comprises, in mass percentage, 35% to 65% of $Al_2O_3$ and 35% to 65% of the boroaluminosilicate mineral material according to claim 1.

4. The low temperature co-fired ceramic composite material according to claim 3, wherein the low temperature co-fired ceramic composite material comprises 41.69% to 62.53% of $Al_2O_3$ and 37.47% to 58.31% of the boroaluminosilicate mineral material.

5. A method for preparing a boroaluminosilicate mineral material, wherein it comprises the following steps:
weighing a sodium source, a potassium source, a calcium source, an aluminum source, a boron source, and a silicon source according to a ratio of elements of the boroaluminosilicate mineral material according to claim 1; mixing and grinding to obtain a boroaluminosilicate mineral grinding slurry;
subjecting the boroaluminosilicate mineral grinding slurry to a drying process to obtain a dry powder;
adding a binder to the dry powder and mixing thoroughly to obtain a mixed powder; and
calcinating the mixed powder at 700° C. to 850° C. to obtain the boroaluminosilicate mineral material.

6. The method for preparing a boroaluminosilicate mineral material according to claim 5, wherein the grinding is ball milling and a ball-milling medium is absolute ethanol.

7. The method for preparing a boroaluminosilicate mineral material according to claim 5, characterized in that the grinding takes from 2 h to 8 h.

8. The method for preparing a boroaluminosilicate mineral material according to claim 5, wherein the drying process is oven-drying, a temperature for the drying process is from 70° C. to 100° C.

9. The method for preparing a boroaluminosilicate mineral material according to claim 5, wherein the binder is selected from at least one of polyvinyl alcohol and polyvinyl butyral.

10. The method for preparing a boroaluminosilicate mineral material according to claim 5, wherein the step of calcinating the mixed powder at 700° C. to 850° C. specifically comprises placing the mixed powder in a muffle furnace and calcinating in the air for 1 h to 5 h.

11. A method for preparing a low temperature co-fired ceramic composite material, wherein it comprises the following steps:
mixing the following components expressed in mass percentage: 35%-65% of $Al_2O_3$ and 35%-65% of the boroaluminosilicate mineral material according to claim 1, followed by grinding to obtain a mixed grinding slurry;
drying the mixed grinding slurry to obtain the low temperature co-fired ceramic composite material.

12. A method for preparing a low temperature co-fired ceramic, wherein it comprises the following steps:
adding a binder to the low temperature co-fired ceramic composite material according to claim 3, mixing to obtain a ceramic powder;
keeping the ceramic powder at 500° C. to 600° C. for 2 h to 3 h for debinding; and
sintering the ceramic powder after the debinding at 850° C. to 950° C. to obtain the low temperature co-fired ceramic.

13. A low temperature co-fired ceramic composite material, wherein the low temperature co-fired ceramic composite material comprises, in mass percentage, 35% to 65% of $Al_2O_3$ and 35% to 65% of the boroaluminosilicate mineral material according to claim 2.

14. A method for preparing a low temperature co-fired ceramic composite material, wherein it comprises the following steps:
mixing the following components expressed in mass percentage: 35%-65% of $Al_2O_3$ and 35%-65% of the boroaluminosilicate mineral material according to claim 2, followed by grinding to obtain a mixed grinding slurry;

drying the mixed grinding slurry to obtain the low temperature co-fired ceramic composite material.

15. A method for preparing a low temperature co-fired ceramic, wherein it comprises the following steps:

adding a binder to the low temperature co-fired ceramic composite material according to claim 4, mixing to obtain a ceramic powder;

keeping the ceramic powder at 500° C. to 600° C. for 2 h to 3 h for debinding; and sintering the ceramic powder after the debinding at 850° C. to 950° C. to obtain the low temperature co-fired ceramic.

* * * * *